United States Patent
Bonnoit et al.

(10) Patent No.: US 12,154,441 B2
(45) Date of Patent: Nov. 26, 2024

(54) SAFETY ASSURANCE FOR PATH PLANNERS

(71) Applicant: Aurora Flight Sciences, Manassas, VA (US)

(72) Inventors: Craig John Bonnoit, Vienna, VA (US); Anubhav Guha, Boston, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 499 days.

(21) Appl. No.: 17/448,557

(22) Filed: Sep. 23, 2021

(65) Prior Publication Data

US 2023/0089833 A1    Mar. 23, 2023

(51) Int. Cl.
G08G 5/00    (2006.01)
G08G 5/04    (2006.01)

(52) U.S. Cl.
CPC ......... *G08G 5/0039* (2013.01); *G08G 5/0021* (2013.01); *G08G 5/045* (2013.01)

(58) Field of Classification Search
CPC ..... G08G 5/0039; G08G 5/0021; G08G 5/045
See application file for complete search history.

(56) References Cited

U.S. PATENT DOCUMENTS

| | | | | |
|---|---|---|---|---|
| 5,615,118 A | * | 3/1997 | Frank ..................... | G01S 13/86 701/4 |
| 6,085,147 A | * | 7/2000 | Myers ................. | G01C 21/3492 342/36 |
| 6,266,610 B1 | * | 7/2001 | Schultz ................ | G06Q 10/047 701/533 |
| 6,477,515 B1 | * | 11/2002 | Boroujerdi ............. | G06Q 10/04 706/14 |
| 7,363,152 B2 | * | 4/2008 | Sjanic .................... | G01C 21/20 701/4 |
| 7,606,658 B2 | * | 10/2009 | Wise ...................... | G01C 23/00 701/457 |

(Continued)

OTHER PUBLICATIONS

Extended European Search Report issued on Feb. 13, 2023 in corresponding European Application No. 22184267.7, 8 pages.

(Continued)

*Primary Examiner* — Luis A Martinez Borrero
(74) *Attorney, Agent, or Firm* — MH2 Technology Law Group LLP

(57) ABSTRACT

Techniques for establishing the sufficiency of a path planner to avoid multiple obstacles in planning a path from a starting location to a destination location is presented. The techniques can include: iterating, until a stopping condition occurs: obtaining, from the path planner, a path from the starting location to the destination location; representing the path from the starting location to the destination location as a disjunction of logical terms; conjoining the disjunction of terms to a conjunction of terms representing previously considered paths; determining a satisfiability condition of the conjunction of terms; and for a positive satisfiability condition, adding at least one corresponding obstacle of the plurality of obstacles to the path planner; and providing an indication of sufficiency of the path planner to avoid the obstacles in planning a path from the starting location to the destination location based on the stopping condition.

18 Claims, 4 Drawing Sheets

(56) References Cited

U.S. PATENT DOCUMENTS

| | | | | |
|---|---|---|---|---|
| 8,090,531 B2* | 1/2012 | Goutelard | G05D 1/0202 | 701/466 |
| 8,209,115 B2* | 6/2012 | Lucas | G08G 5/0039 | 701/122 |
| 8,234,068 B1* | 7/2012 | Young | G08G 5/0069 | 701/410 |
| 8,280,626 B2* | 10/2012 | Klooster | G05D 1/0676 | 701/3 |
| 8,554,458 B2* | 10/2013 | Sawhill | G08G 5/0043 | 701/120 |
| 8,594,917 B2* | 11/2013 | Sawhill | G08G 5/0017 | 701/122 |
| 8,868,345 B2* | 10/2014 | Lax | G01W 1/00 | 702/3 |
| 8,954,262 B2* | 2/2015 | Sawhill | G08G 5/0082 | 701/122 |
| 8,965,672 B2* | 2/2015 | Sawhill | G08G 5/0052 | 701/120 |
| 9,127,913 B2* | 9/2015 | Neff | F41G 7/343 | |
| 9,164,510 B2* | 10/2015 | Mian | G05D 1/0274 | |
| 9,171,473 B1* | 10/2015 | McNally | G08G 5/0095 | |
| 9,262,928 B2* | 2/2016 | Sampigethaya | B64D 43/00 | |
| 9,513,125 B2* | 12/2016 | Ravenscroft | G08G 5/0069 | |
| 9,620,022 B2* | 4/2017 | Sane | G08G 5/0047 | |
| 9,830,827 B2* | 11/2017 | Sawhill | G08G 5/0043 | |
| 10,635,913 B2* | 4/2020 | Yang | G08G 5/045 | |
| 10,636,313 B2* | 4/2020 | Mere | G08G 5/0021 | |
| 10,860,115 B1* | 12/2020 | Tran | G08G 5/0039 | |
| 11,043,131 B2* | 6/2021 | De Villele | G08G 5/0039 | |
| 11,353,888 B2* | 6/2022 | Iyer | G08G 5/0021 | |
| 11,436,928 B2* | 9/2022 | Grimald | G08G 5/0034 | |
| 11,525,691 B2* | 12/2022 | Paden | G05D 1/0274 | |
| 11,727,812 B2* | 8/2023 | Cao | G08G 5/0013 | 701/120 |
| 11,854,407 B2* | 12/2023 | Herriot | G08G 5/0034 | |
| 2005/0192749 A1* | 9/2005 | Flann | G01C 21/20 | 701/410 |
| 2009/0063035 A1* | 3/2009 | Mandel | G06F 30/18 | 701/437 |
| 2012/0191333 A1* | 7/2012 | Sawhill | G08G 5/0043 | 701/122 |
| 2014/0163850 A1* | 6/2014 | Sawhill | G08G 5/0043 | 701/120 |
| 2014/0188378 A1* | 7/2014 | Sawhill | G08G 5/0013 | 701/122 |
| 2015/0154873 A1* | 6/2015 | Sawhill | G08G 5/045 | 701/122 |
| 2017/0069214 A1* | 3/2017 | Dupray | G08G 5/0008 | |
| 2017/0308102 A1* | 10/2017 | Sane | G01C 21/34 | |
| 2018/0040250 A1* | 2/2018 | Sawhill | G08G 5/0052 | |
| 2018/0172450 A1* | 6/2018 | Lalonde | G01C 21/3407 | |
| 2020/0118446 A1* | 4/2020 | Saunders | G08G 5/045 | |
| 2022/0004205 A1* | 1/2022 | McNair | G05D 1/106 | |
| 2022/0269290 A1* | 8/2022 | Dadkhah Tehrani | G05D 1/102 | |
| 2023/0078502 A1* | 3/2023 | Bonnoit | G01C 21/20 | 701/3 |

OTHER PUBLICATIONS

Andert et al., Mapping and Path Planning in Complex Environments: An Obstacle Avoidance Approach for an Unmanned Helicopter, 2011 IEEE International Conference on Robotics and Automation, Shanghai International Conference Center, May 9-13, 2011, 6 pages.

Cetin et al., "Hybrid Mixed-Logical Linear Programming Algorithm for Collision-Free Optimal Path Planning," IET Control Theory Appl., 2007, 1, (2), pp. 522-531.

Nieuwenhuisen et al., "Efficient Path Planning in Changing Enviroments," Proceedings of the 2007 IEEE/RSJ International Conference on Intelligent Robots and Systems, San Diego, CA, USA, Oct. 29, 2007 through Nov. 2, 2007, 7 pages.

Kochenderfer et al., "Next-Generation Airborn Collision Avoidance System," Lincoln Laboratory Journal, vol. 19, No. 1, 2012, pp. 17-33.

* cited by examiner

SAFETY ASSURANCE FOR PATH PLANNERS

FIELD

The subject matter described herein generally relates to path planners for a vehicle such as an aircraft. More particularly, the subject matter described herein relates to analyzing path planners for sufficiency in avoiding obstacles.

BACKGROUND

The problem of dynamically sensing and avoiding other moving entities is a central challenge to path planning for computer controlled vehicles today in multiple domains (e.g., land, sea surface, undersea, and air). Path planning specifies a configuration of the vehicle over space and time, and such a plan can then be converted into commands to the vehicle's actuation and ultimately realized in the physical world. An application of the path planning problem includes computing a path to a destination that avoids collision with static and dynamic obstacles of known extent and is minimal with respect to time, distance, or risk. This is itself a NP-complete problem if the system dynamics pose a holonomic constraint. The avoiding part of this problem is an instance of the general planning problem. Assurance and verification of planning for avoidance are critical technical challenges for many autonomous systems currently under development.

There is a significant amount of prior work concerning obtaining proofs of sufficiency of control systems. Such proofs generally take a known algebraic and numeric representation of continuous dynamics inclusive of a plant model and a controller and show that within the confines of a such a model the system is stable, controllable, and responsive. In the study of hybrid systems, this is extended to include mixed discrete degrees of freedom to represent phenomena including mode switching which might be present in configurable cyber-physical systems.

In the aerospace domain, the Federal Aviation Administration's Aircraft Collision Avoidance System, ACAS-X, addresses the sense and avoid problem by issuing advisories for a pilot to climb or descend at variable rates based on the scenario geometry. Verification of this system has been studied formally using an automatic theorem prover. However, this work is significantly limited because the ACAS-X planner is extremely confined and capable of only one of a small family of discrete suggestions, while more modern planners cover exponentially large choice spaces for which these verification techniques do not scale.

SUMMARY

According to various examples, a method of establishing a sufficiency of a path planner to avoid a plurality of obstacles in planning a path from a starting location to a destination location is presented. The method includes: iterating, until a stopping condition of a plurality of predetermined stopping conditions occurs: obtaining, from the path planner, a path from the starting location to the destination location; representing the path from the starting location to the destination location as a disjunction of logical terms; conjoining the disjunction of terms to a conjunction of terms representing previously considered paths from the starting location to the destination location; determining a satisfiability condition of the conjunction of terms; and for a positive satisfiability condition, adding at least one corresponding obstacle of the plurality of obstacles to the path planner; and providing an indication of sufficiency of the path planner to avoid the obstacles in planning a path from the starting location to the destination location based on the stopping condition.

Various optional features of the above examples include the following. The indication of sufficiency may be positive, and the method may further include traversing, by a vehicle, a path produced by the path planner. The vehicle may include an aircraft, and the path planner may be implemented in the aircraft. The plurality of predetermined stopping conditions can include: a stopping condition comprising that the satisfiability condition of the conjunction of terms is negative at some stage in the iterating; and a stopping condition comprising that the path planner fails to provide a path at some stage in the iterating. The method may further include: partitioning a space between the starting location and the destination location into a plurality of partially overlapping parts; and representing the obstacles as a subset of the plurality of partially overlapping parts. The space may be three dimensional, and each part may include a polytope. Each of the logical terms may correspond to a part of the plurality of partially overlapping parts. Each of the logical terms can represent a statement that is true if and only if a corresponding part includes an obstacle. The representing the path from the starting location to the destination location as the disjunction of logical terms may include: applying a membership algorithm to the path from the starting location to the destination location and to the plurality of overlapping parts. The determining the satisfiability condition of the conjunction of terms may include applying an incremental satisfaction algorithm.

According to various examples, a system for establishing a sufficiency of a path planner to avoid a plurality of obstacles in planning a path from a starting location to a destination location is presented. The system includes: an electronic processor; and electronic persistent memory comprising instructions that, when executed by the electronic processor, configure the electronic processor to perform operations comprising: iterating, until a stopping condition of a plurality of predetermined stopping conditions occurs: obtaining, from the path planner, a path from the starting location to the destination location; representing the path from the starting location to the destination location as a disjunction of logical terms; conjoining the disjunction of terms to a conjunction of terms representing previously considered paths from the starting location to the destination location; determining a satisfiability condition of the conjunction of terms; and for a positive satisfiability condition, adding at least one corresponding obstacle of the plurality of obstacles to the path planner; and providing an indication of sufficiency of the path planner to avoid the obstacles in planning a path from the starting location to the destination location based on the stopping condition.

Various optional features of the above examples include the following. The indication of sufficiency may be positive. The vehicle may include an aircraft, and the path planner may be implemented in the aircraft. The plurality of predetermined stopping conditions may include: a stopping condition comprising that the satisfiability condition of the conjunction of terms is negative at some stage in the iterating; and a stopping condition comprising that the path planner fails to provide a path at some stage in the iterating. The operations may include: partitioning a space between the starting location and the destination location into a plurality of partially overlapping parts; and representing the obstacles as a subset of the plurality of partially overlapping parts. The space may be three dimensional, and each part may include a polytope. Each of the logical terms may correspond to a part of the plurality of partially overlapping parts. Each of the logical terms may represent a statement that is true if and only if a corresponding part includes an obstacle. The representing the path from the starting location to the destination location as the disjunction of logical terms may include: applying a membership algorithm to the path from the starting location to the destination location and to the plurality of overlapping parts. The determining the satisfiability condition of the conjunction of terms may include applying an incremental satisfaction algorithm.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
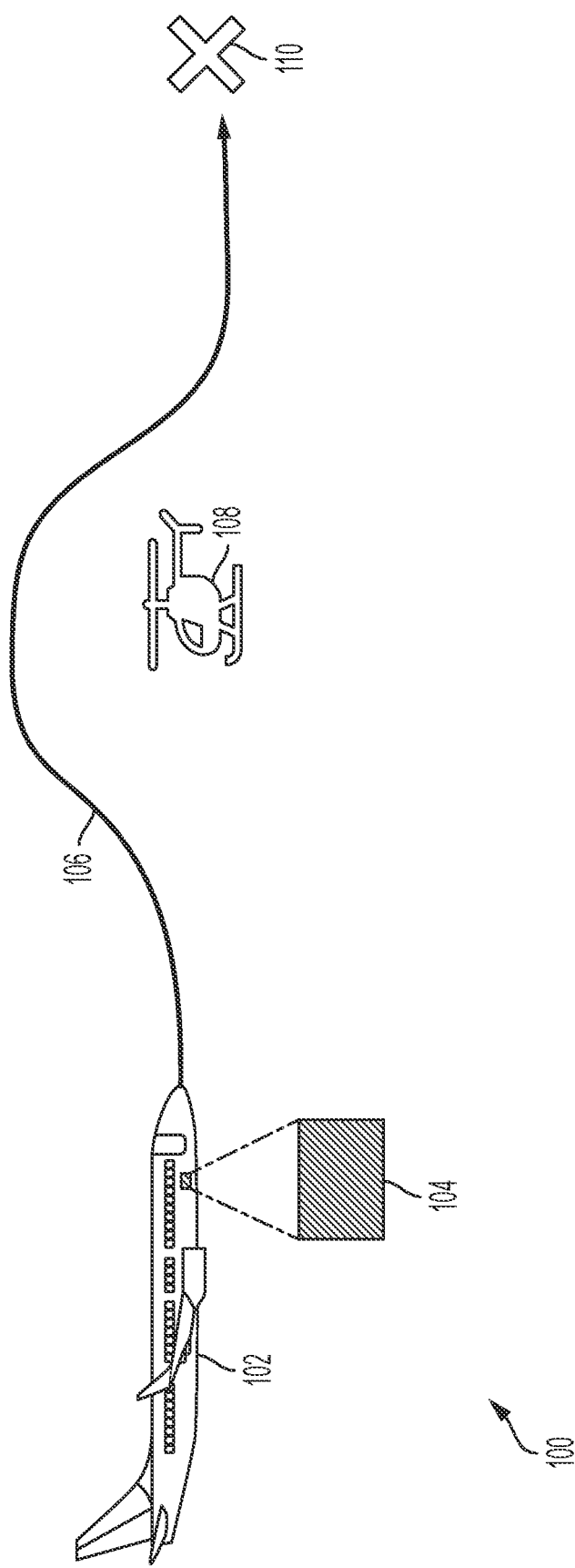
FIG. 1 is a schematic diagram of path planning in the aerospace domain according to various examples.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

Some examples provide an obstacle avoidance sufficiency proof for a path planner for which it is desirable to treat the path planner itself as an arbitrary black box. Unlike prior work in control or ACAS-X, no assumption is required on how the path planner works, nor is there any limitation on the support of paths that it can generate. This allows for verification of complex path planning techniques that do not translate to concise algebraic representations, or for which the algebraic representation would be prohibitively large and computationally intractable.

Some examples make formal statements about a path planner based on the expressivity of feasible paths it can produce. Some examples represent the sufficiency of a collection of paths to avoid any of combination of a fixed number of obstacles in a known family of obstacles as a Boolean satisfiability problem. Once this has been done, a Boolean satisfiability solver will either prove that the problem is unsatisfiable, in which case the example provides a guarantee that the path planner is sufficiently expressive that it cannot be defeated by any set of obstacles in the problem class, or it will prove that the problem is satisfiable with a particular assignment of variables that corresponds to a specific set of obstacles that block all known paths. This set of obstacles may then be fed back into the path planner, which will either declare that it is unable to solve the given problem instance (an existence proof that the path planner is insufficient to cover the problem class), or create a new path that can be added to the set of paths and treated as an additional conjunction in the Boolean satisfiability problem for the next iteration. This process proceeds until one of the two stop conditions occur, which is guaranteed to happen because the decision space is finite and bounded. In many cases, this set of operations completes far faster than the exhaustive upper bound on time.

Examples may have a number of features and advantages. Some examples codify a verification problem for a sufficiency of a path planner to generate a path that avoids obstacles in a mathematically precise geometric union as a Boolean satisfiability problem for a propositional logic expression in conjunctive normal form. Some examples utilize a path planner and Boolean satisfiability solver in adversarial roles to guide efficient search for either positive or negative proofs of path planner sufficiency. In particular, some examples utilize an algorithm for Boolean satisfiability modified to increase runtime performance in the context of repeated queries as are made by the path planner validation process when those repeated queries have an incremental structure in which each successive query adds an additional conjunctive clause to the expression. For example, some examples utilize a Boolean satisfiability algorithm modified as an incremental computational form to avoid rework in the context of an application with an adversarial constraint generator. According to some examples, such a modified Boolean satisfiability algorithm greatly enhances the runtime performance and viability of examples in handling practical problems of interest.

FIG. 1 is a schematic diagram 100 of path planning in the aerospace domain according to various examples. As shown, aircraft 102 includes onboard path planner 104, which generates paths, such as path 106, that avoid known obstacles, such as dynamic obstacle 108, in reaching a destination 110. Examples may be used to determine whether or not path planner 104 is sufficiently flexible to avoid obstacles, such as dynamic obstacle 108, from a defined finite set of arbitrary obstacles. Examples may be used with any vehicle, including by way of non-limiting example, aircraft, ships, submarines, automobiles, trucks, factory robots, unmanned ariel, submersible, and terrestrial vehicles, and any other vehicle that is autonomous or that can be controlled by a computer autonomously or semi-autonomously. Examples may be used with any type of path planner, and the internal workings of the path planner need not be known. That is, examples may be applied to any "black box" path planner.

Figure 2:
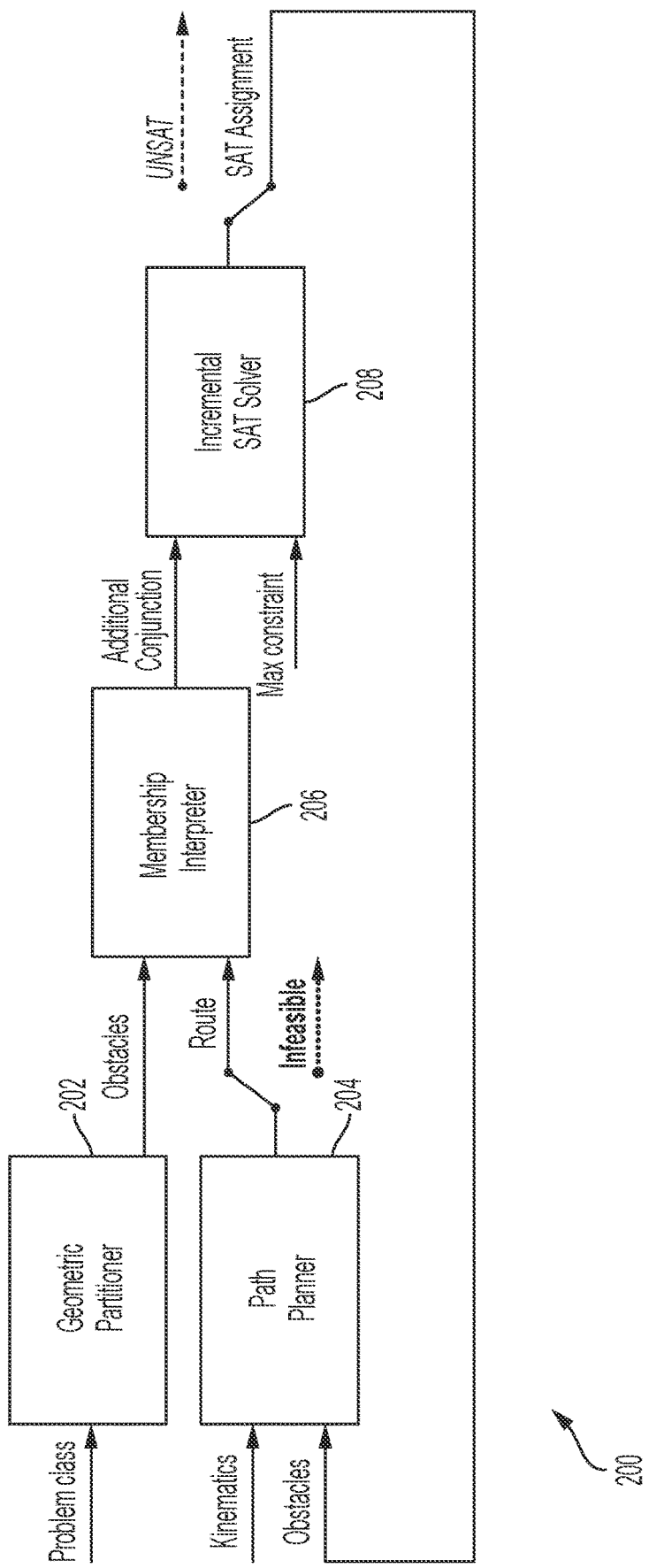
FIG. 2 is a schematic diagram of a system 200 for establishing the sufficiency of a path planner to avoid obstacles in planning a path from a starting location to a destination location.

FIG. 2 is a schematic diagram of a system 200 for establishing the sufficiency of a path planner to avoid obstacles in planning a path from a starting location to a destination location. System 200 may be implemented using hardware such as that shown and described herein in reference to FIG. 4, for example.

System 200 includes geometrical partitioner 202. Geometrical partitioner 202 decomposes a problem class describing a set of physical scenarios that could occur involving up to a fixed number of obstacles of specified geometry being encountered into countable unions over a discrete finite basis of obstacles. For example, geometric partitioning 202 may virtually partition the space into a number of partially overlapping space-filling polytope parts. The space may be located as being generally between a starting location of the vehicle (e.g., a present location of the vehicle) and a destination location of the vehicle (e.g., a final destination or a destination specified as some location further along the vehicle's intended route), or located within a set radius from the vehicle, by way of non-limiting examples. In two dimensions, the parts may be implemented as, by way of non-limiting examples, squares, triangles, rectangles, or hexagons. In three dimensions, such parts may be implemented as, by way of non-limiting examples, tetrahedrons, cubes, parallelepipeds, or icosahedrons. The parts of the partition may partially overlap. For example, the parts may overlap in order to ensure that any arbitrarily positioned obstacle always lies entirely within at least one part. Thus, the area (for two dimensions) or volume (for three dimensions) of overlap of the parts may be selected to enclose the profile (for two dimensions) or the entirety (for three dimensions) of a typical obstacle. Obstacles may be specified in absolute position or relative position, depending on the relevance of interaction with other constraints in the problem.

The original problem class may be specified in terms of a continuous statement that is converted into a discrete cover by geometrical partitioner 202. For example, the problem class may specify a maximum number of obstacles and a volume (in three dimensions) or an area (in two dimensions) in which the obstacles may be located. An example problem class is the statement "up to N airplanes each occupying a cylindrical volume with radius R and height Z are detected between distances $D_1$ and $D_2$ away". Note in this example, the problem class includes a statement over the real numbers (any position between distances $D_1$ and $D_2$ away), while the output of geometrical partitioner 202 will be discrete (an overlapping mesh of some polytope) such that paths that are not members of the partition obstacles are guaranteed not to be members of any set of obstacles in the original (continuous) problem class. For example, the output may be such that, for every set of obstacles in the original (continuous) problem class, there exists a collection of members of the partition of equal number such that any point contained in an obstacle of the original (continuous) problem is contained in one of the partition members of the resulting (discrete) problem. This implies that for any collection of paths for which there does not exist a single choice of partition members (of appropriate number) such that every path of the collection intersects at least one of the chosen partition members, there cannot exist a set of obstacles in the original continuous problem class that simultaneously intersects each path in the collection. Accordingly, an infeasibility result in the discrete version of the problem is a sufficient guarantee for infeasibility for the original continuous problem.

In sum, geometrical partitioner 202 reduces the continuous space of vehicle operation between a starting location and a destination location to discrete space, where various obstacles may be identified with the parts of the overlapping partition in which they are located.

System 200 also includes path planner 204. Path planner 204 may be an arbitrary path planner capable of taking in a starting location, a destination location, and a characterization of a set of obstacles to avoid, and either creating at least one path (trajectory) around them or declaring that the problem is infeasible within the search space and bounds of path planner 204. Path planner 204 may be algebraic based and/or make use of mobility graphs according to various non-limiting examples. Path planner may include or be implemented in hardware such as that shown and described herein in reference to FIG. 4. Path planner 204 may be deployed aboard the vehicle or may be deployed at a different location.

System 200 further includes membership interpreter 206. Membership interpreter 206 accepts as input a path, e.g., as produced by path planner 204, and a partition, e.g., as produced by geometric partitioner 202. Membership interpreter 206 outputs a discrete union of parts of the partition that the path impinges on. Membership interpreter 206 may utilize any of a variety of techniques to perform the membership determination, by way of non-limiting examples, explicit comparison (e.g., halfspace inequality testing for polytope obstacles) or other geometric methods (e.g., k-d trees, Voronoi diagrams, etc.).

System 200 further includes incremental SAT solver 208. Incremental SAT solver 208 determines whether there exists a set of obstacles in the partition, subject to constraints such as a maximum number of obstacles, that would block all known paths (e.g., contain at least one member of the output of membership interpreter 206 for all known paths). This makes use of a reduction of the geometrical collision problem to a representative Boolean satisfiability problem for a particular propositional logic formula. Incremental SAT solver 208 then determines whether the particular propositional logic formula is satisfiable using Boolean satisfiability techniques, such as backtracking or conflict driven search (e.g., the Davis-Putnam-Logemann-Loveland algorithm). That is, incremental SAT solver 208 determines whether the particular propositional logic formula is unsatisfiable, or whether there is an assignment of propositional variables corresponding to permissible obstacles that satisfies it. Its satisfaction indicates that the path is blocked by a set of obstacles corresponding to the assignment of propositional variables, and its unsatisfiability indicates that path planner 204 is capable of routing around the obstacles.

While a standard propositional logic satisfiability algorithm may be used for incremental SAT solver 208, some examples utilize a modification of a standard SAT solver that is particularly efficient for incremental inquiries. That is, in the context of the establishing the sufficiency of a path planner problem in which repeated SAT queries will be made with additional paths added sequentially, some examples include a modification of a standard SAT algorithm to support incremental addition to the set of clauses in the propositional logic formula without requiring rebuilding any satisfiability tree rollouts. This may be accomplished by noting that since tree nodes (corresponding to propositional logic variable assignments) known to be infeasible or indeterminate stay infeasible or indeterminant (respectively), while there is at most one open node that specifies a set of propositional logic variable assignments that satisfies the problem that can be directly checked and treated as the starting point for further iteration on the appending of a clause.

System 202 provides elements that may be used to execute an iterative method. Briefly, according to various examples, geometrical partitioner 202 defines a space over which validation is possible, and then path planner 204 and incremental SAT solver 208 are the anchors in an iteration that creates additional clauses and proves (or disproves) the sufficiency of path planner 204. Execution of path planner 204 is responsible for enlarging the set of clauses incremental SAT solver 208 must satisfy, while execution of incremental SAT solver 208 is responsible for specifying a path planning problem for path planner 204 to solve within the class created by geometrical partitioner 202. These and other actions are described in detail presently in reference to FIG. 3.

Figure 3:
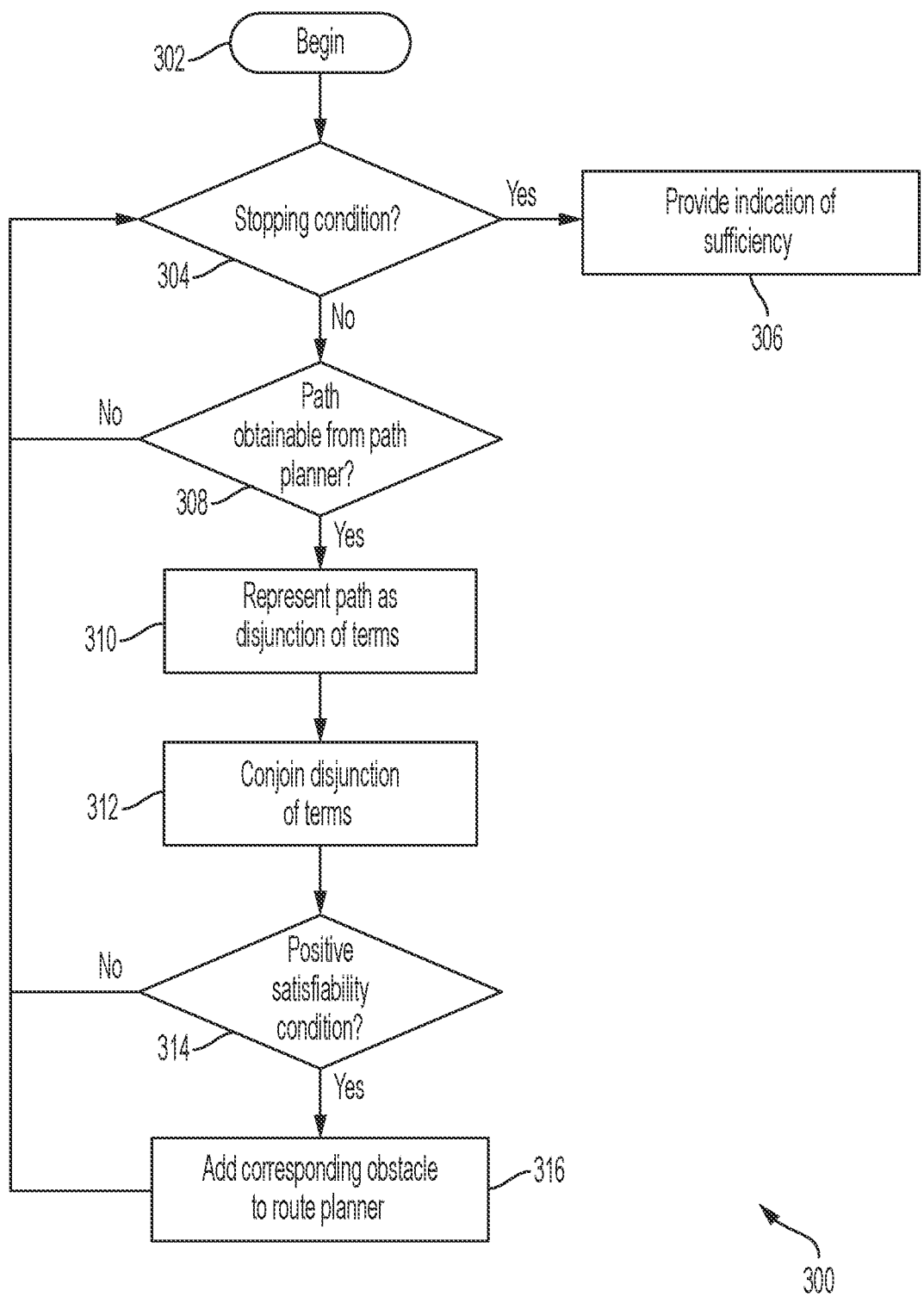
FIG. 3 is a flow diagram of a method for establishing the sufficiency of a path planner to avoid obstacles in planning a path from a starting location to a destination location.

FIG. 3 is a flow diagram of a method 300 for establishing the sufficiency of a path planner to avoid obstacles in planning a path from a starting location to a destination location. Method 300 may be implemented by system 200 as shown and described herein in reference to FIG. 2, e.g., using hardware 400 as shown and described herein in reference to FIG. 4. The actions of method 300 may be performed in any order that enable operation.

At 302, method 300 may begin. Method 300 may proceed to iterate actions 308, 310, 312, 314, and 316 until one of a plurality of predetermined stopping conditions occur at 304. Example stopping conditions are described further below. If a stopping condition occurs, then control passes to 306. Otherwise, if no stopping condition occurs, then control passes to 308.

At 308, method 300 attempts to obtain, from a path planner, such as path planner 204, a path from the starting location to the destination location. The path planner may accept a start location, an end location, and description of possible obstacles (e.g., a problem class) and generate a path from the start location to the end location that either avoids the obstacles or declare that no path is possible. The starting location may be the location of the start of a trip or may be a current location of the vehicle during the trip, by way of non-limiting examples. The destination location may be the final location of the end of the trip, or may be a location at some point further along the trip than a present location of the vehicle. At the first iteration of method 300, the set of obstacles provided as constraints to the path planner may be empty; that is, no obstacles may be considered by the path planner in the first iteration. Each iteration after the first may add zero or more additional obstacles as constraints to the path planner, as described below in reference to 314 and 316. The path may be held in electronic memory and/or stored in persistent storage, for example. If the path planner cannot route around the obstacles for a given iteration, then control passes to 304. Otherwise, control passes to 310.

At 310, method 300 represents the path from the starting location to the destination location as a disjunction of logical terms. According to some examples, method 300 may first apply a geometric partitioner, e.g., geometric partitioner 202, to the space generally between the starting location and the destination location to obtain a partition of partially overlapping parts. According to such examples, method 300 may then apply a membership interpreter, e.g., membership interpreter 206, to the path obtained at 308 with respect to the partition of partially overlapping parts. The membership interpreter outputs identifications of the parts in the partition that intersect the path. By way of non-limiting example, the identifications may be in the form of numerals corresponding to the respective parts for some enumeration of the parts in the partition. By way of non-limiting example, there may be hundreds, thousands, tens of thousands, hundreds of thousands, or millions of parts that intersect a particular path.

Method 300 then represents each part in the partition that intersects the path as a propositional variable, e.g., a literal. If the propositional variable is true, then the corresponding part is considered blocked by some obstacle; if false, then the corresponding part is considered traversable. By way of non-limiting illustrative example, if a path from the starting location to the destination location intersects parts x, y, and z, then the corresponding disjunction of logical terms may be represented as, e.g., XVYVZ, where part x corresponds to propositional variable X, part y corresponds to propositional variable Y, and part z corresponds to propositional variable Z. The disjunction of propositional variables "XVYVZ" may be interpreted as "X or Y or Z". If any of parts x, y, or z are blocked, then the corresponding propositional variable X, Y, or Z is considered true. Thus, the disjunction XVYVZ is true if, and only if, at least one of X, Y, or Z is true, which occurs if, and only if, at least one of parts x, y, and z is blocked.

At 312, method 300 conjoins the disjunction of terms from 310 to a conjunction of disjunctions of terms representing previously considered paths from the starting location to the destination location. For example, for the first iteration of method 300, there may be no previously considered paths, in which case the actions of 310 include retaining the disjunction of terms from 310. As another example, for iterations after the first iteration, there may be previously considered paths from the actions of 310 from the previous iterations, and corresponding disjunctions of terms, in which case the disjunction from the present iteration is conjoined to the conjunction of disjunctions of terms representing previously considered paths from the starting location to the destination location. In symbols, each iteration $i>1$ may produce a conjunction of terms, denoted $\Phi_i = \bigvee_{j=1}^{n_i} X_{i,j} = X_{i,1} \vee X_{i,2} \vee X \ldots \vee X_{i,n_i}$, where each $X_{i,j}$ for j from 1 to $n_i$ is a propositional variable representing a part in the partition that intersects the path obtained at 308 from the i-th iteration of method 300, and $n_i$ represents the number of terms in the conjunction (corresponding to the number of parts from the partition in the respective path). Then at each iteration i, the disjunction of terms $\Phi_i$ from that iteration is conjoined to the disjunctions from pervious iterations $\Phi_{i-1}$, $\Phi_{i-2}, \ldots, \Phi_2, \Phi_1$ as, for example, $\Psi_i = \bigwedge_{k=1}^{m_i} \Phi_k = \Phi_1 \wedge \Phi_2 \wedge \ldots \wedge \Phi_{m_i}$. The conjunction of terms may be stored in dynamic or persistent memory.

At 314, method 300 determines a satisfiability condition, e.g., "satisfiable" or "not satisfiable", of the conjunction of terms $\Psi_i$. According to some examples, method 300 may apply a Boolean solver, e.g., incremental SAT solver 208 as shown and described herein in reference to FIG. 2, to the conjunction of terms $\Psi_i$. The Boolean solver may accept as input a description of constraints, such as a maximum number of obstacles. The Boolean solver then determines whether an assignment of TRUE to a set of propositional variables in the conjunction of terms $\Psi_i$, consistent with the constraints such as a maximum number of obstacles, satisfies the conjunction of terms $\Psi_i$.

For examples that utilize an incremental SAT solver, such as incremental SAT solver 208, the satisfiability determination of $\Psi_i = \Psi_{i-1} \wedge \Phi_i$ may be accomplished by using the past satisfiability result for $\Psi_{i-1}$ (and/or a corresponding past satisfiability tree representing propositional variable truth assignments) and determining the satisfiability of $\Phi_i$, e.g., using backtracking or conflict driven search such as the Davis-Putnam-Logemann-Loveland algorithm. In this manner, the incremental SAT solver uses results from past iterations to expedite satisfiability determinations in a present iteration.

For a negative satisfiability condition at 314, control returns to 304.

For a positive satisfiability condition at 314, control passes to 316. At 316, method 300 adds at least one corresponding obstacle of the plurality of obstacles as a constraint to the path planner. In more detail, as described above in reference to 310, a positive satisfiability result for the conjunction $\Psi_i = \bigwedge_{k=1}^{m_i} \Phi_k = \Phi_1 \wedge \Phi_2 \wedge \ldots \wedge \Phi_{m_i}$ occurs if, and only if, some assignment of TRUE/FALSE to its propositional variables satisfies it. The propositional variables that are assigned TRUE in such an assignment correspond to parts in the partition that are then provided to the path planner as additional constraints at 316. Control then returns to 304.

At 304, method determines whether one of a plurality of stopping conditions has occurred. According to some examples, two predetermined stopping conditions are possible, where a first stopping condition indicates that the path planner is sufficiently flexible to route around the obstacles described in the original problem class, and a second stopping condition indicates that the path planner is incapable of routing around the obstacles. The first stopping condition, which indicates that the path planner is sufficiently flexible to route around the obstacles, may occur when the satisfiability condition of the conjunction of terms $\Psi_i$ is negative, i.e., unsatisfiable, at some stage i of the iteration. The second stopping condition, which indicates that the path planner is incapable of routing around obstacles constrained by the original problem description, may occur when the path planner fails to provide a path at 308 at some stage i of the iteration.

For examples in which the number of obstacles is finite, one of the two stopping conditions described above is guaranteed to occur. Iterations of method 300 may result in the creation of at least one new disjunction of terms at 310 corresponding to one new obstacle configuration, and there are a bounded number of such choices when the number of obstacles is finite, for example. In practice, method 300 has been shown to terminate far more quickly than the naïve exhaustive bound because the adversarial nature of the interactions between the path planner and the SAT solver is exercised in increasingly challenging situations as the SAT solver learns to avoid what the path planner can solve.

For problems classes in which the number of obstacles is infinite or the volume in which they appear is unbounded, method 300 can still generate valid results, but it may not be formally guaranteed to result in a stopping condition as described herein. In such cases, e.g., depending on the origin of the unbounded space, literals may be lazily read off membership as they are implicitly found by the execution of the path planner, rather than attempting to explicitly allocate or pre-declare literals. Method 300 may terminate for such problem classes after a fixed predetermined number of iterations, for example.

At 316, method 300 provides an indication of sufficiency of the path planner to avoid the obstacles in planning a path from the starting location to the destination location based on the stopping condition determined at 304. For example, for the first stopping condition described above, method 300 may output an indication that the path planner is sufficient to avoid the obstacles in planning a path from the starting location to the destination location. As another example, for the second stopping condition described above, method 300 may output an indication that the path planner is not sufficient to avoid the obstacles in planning a path from the starting location to the destination location. Method 300 may output the indication in any of a variety of manners, such as displaying the indication on a computer monitor.

Figure 4:
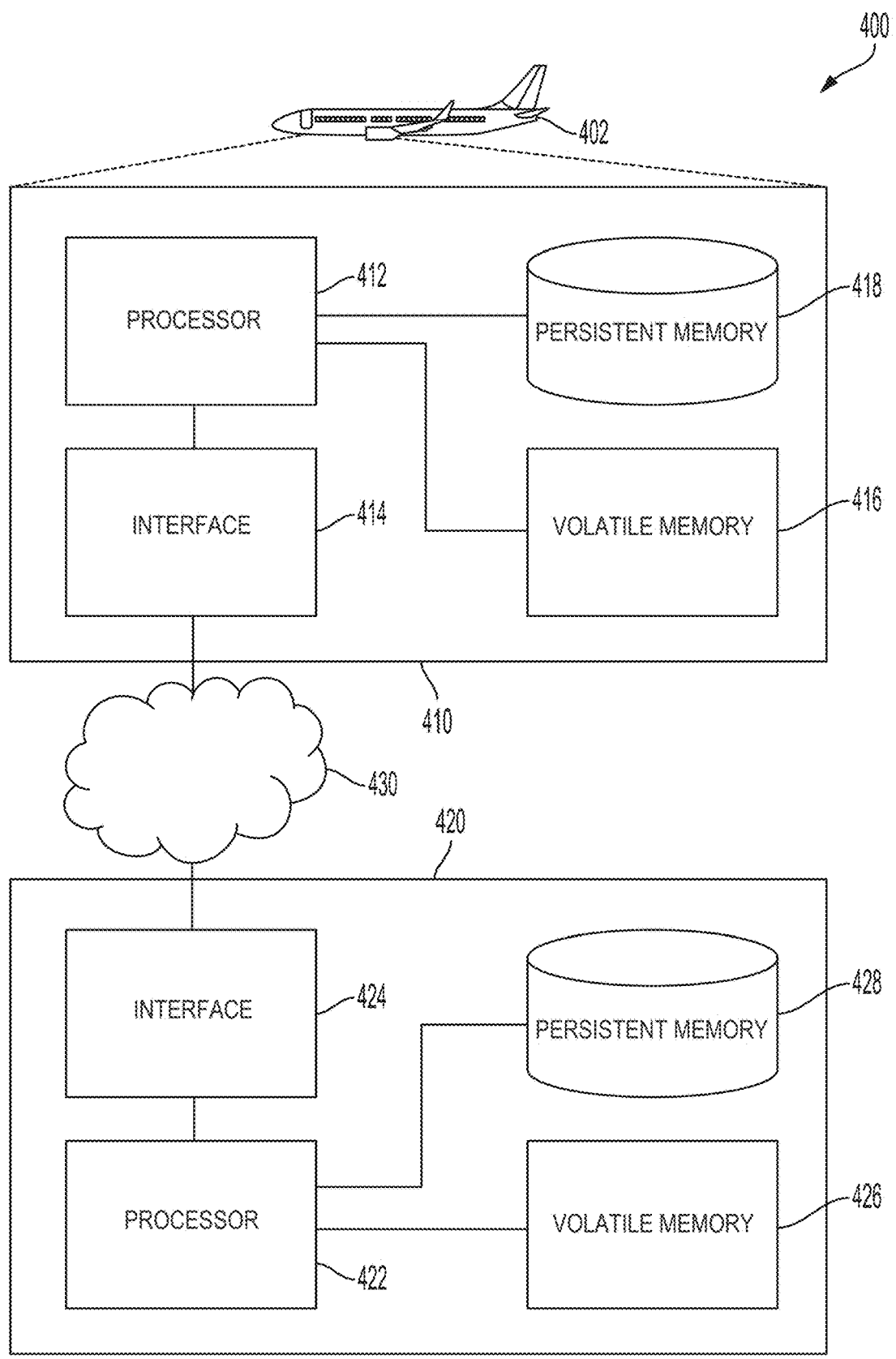
FIG. 4 is a schematic diagram of example hardware suitable for implementing various examples.

FIG. 4 is a schematic diagram of example hardware 400 suitable for implementing various examples. Hardware 400 includes vehicle 402, which may be any type of computer-controllable vehicle. Vehicle 402 utilizes path planner 410, which may be located on board vehicle 402 or remote from vehicle 402.

Path planner 410 may be implemented as any of a desktop computer, a laptop computer, can be incorporated in one or more servers, clusters, or other computers or hardware resources, or can be implemented using cloud-based resources. Path planner 410 includes volatile memory 416 and persistent memory 418, the latter of which can store computer-readable instructions, that, when executed by electronic processor 412, configure path planner 410 as shown and described herein.

Path planner 410 includes network interface 414, which communicatively couples path planner 410 to computer 420 via network 430. Network 430 may include one or more computer networks, and may include the internet or portions thereof. According to some examples, path planner 410 is coupled directly to computer 420. According to some examples, path planner 410 and computer 420 are implemented on the same computer.

Computer 420 includes volatile memory 426 and persistent memory 428, the latter of which can store computer-readable instructions, that, when executed by electronic processor 422, configure computer 420 to at least partially perform methods disclosed herein, e.g., method 300, as shown and described herein in reference to FIG. 3. Computer 420 includes network interface 424, which communicatively couples computer 420 to path planner 410 via network 430. Other configurations of hardware 400 sare possible.

Variations, modifications, and use cases for disclosed examples are many and diverse. For example, some examples may be used as part of a multi-step path planning process, in which the first step generates a bundle of high diversity paths, and the second step selects or derives a path out of that bundle. This may be accomplished by using a path planner and a SAT solver in conjunction to guide efficient exploration of the expressive space of a path planner subject to appropriate constraints.

As another example, some examples may be used as part of building a lookup table of maneuvers. In particular, when the SAT solver returns a result of "unsatisfiable", the collection of paths implicitly associated with the respective propositional logical conjunctive formula constitutes a sufficient basis such that at least one of them can be used to avoid any scenario in the problem class. The paths can then be explicitly persisted to memory, e.g., hard disk, and used at the time of vehicle operation as part of a lookup based strategy, e.g., for conflict avoidance.

Clause 1: A method of establishing a sufficiency of a path planner to avoid a plurality of obstacles in planning a path from a starting location to a destination location, the method comprising iterating, until a stopping condition of a plurality of predetermined stopping conditions occurs: obtaining, from the path planner, a path from the starting location to the destination location; representing the path from the starting location to the destination location as a disjunction of logical terms; conjoining the disjunction of terms to a conjunction of terms representing previously considered paths from the starting location to the destination location; determining a satisfiability condition of the conjunction of terms; and for a positive satisfiability condition, adding at least one corresponding obstacle of the plurality of obstacles to the path planner; and providing an indication of sufficiency of the path planner to avoid the obstacles in planning a path from the starting location to the destination location based on the stopping condition.

Clause 2: The method of Clause 1, wherein the indication of sufficiency is positive, the method further comprising traversing, by a vehicle, a path produced by the path planner.

Clause 3: The method of Clause 2, wherein the vehicle comprises an aircraft, and wherein the path planner is implemented in the aircraft.

Clause 4: The method of any of Clauses 1-3, wherein the plurality of predetermined stopping conditions comprise a stopping condition comprising that the satisfiability condition of the conjunction of terms is negative at some stage in the iterating; and a stopping condition comprising that the path planner fails to provide a path at some stage in the iterating.

Clause 5: The method of any of Clauses 1-4, further comprising partitioning a space between the starting location and the destination location into a plurality of partially overlapping parts; and representing the obstacles as a subset of the plurality of partially overlapping parts.

Clause 6: The method of Clause 5, wherein the space is three dimensional, and wherein each part comprises a polytope.

Clause 7: The method of Clause 5 or 6, wherein each of the logical terms corresponds to a part of the plurality of partially overlapping parts.

Clause 8: The method of Clause 7, wherein each of the logical terms represents a statement that is true if and only if a corresponding part includes an obstacle.

Clause 9: The method of any of Clauses 5-8, wherein the representing the path from the starting location to the destination location as the disjunction of logical terms comprises: applying a membership algorithm to the path from the starting location to the destination location and to the plurality of overlapping parts.

Clause 10: The method of any of Clauses 1-9, wherein the determining the satisfiability condition of the conjunction of terms comprises applying an incremental satisfaction algorithm.

Clause 11: A system for establishing a sufficiency of a path planner to avoid a plurality of obstacles in planning a path from a starting location to a destination location, the system comprising: an electronic processor; and electronic persistent memory comprising instructions that, when executed by the electronic processor, configure the electronic processor to perform operations comprising: iterating, until a stopping condition of a plurality of predetermined stopping conditions occurs: obtaining, from the path planner, a path from the starting location to the destination location; representing the path from the starting location to the destination location as a disjunction of logical terms; conjoining the disjunction of terms to a conjunction of terms representing previously considered paths from the starting location to the destination location; determining a satisfiability condition of the conjunction of terms; and for a positive satisfiability condition, adding at least one corresponding obstacle of the plurality of obstacles to the path planner; and providing an indication of sufficiency of the path planner to avoid the obstacles in planning a path from the starting location to the destination location based on the stopping condition.

Clause 12: The system of Clause 11, wherein the indication of sufficiency is positive.

Clause 13: The system of Clause 11, wherein the vehicle comprises an aircraft, and wherein the path planner is implemented in the aircraft.

Clause 14: The system of any of Clauses 11-13, wherein the plurality of predetermined stopping conditions comprise: a stopping condition comprising that the satisfiability condition of the conjunction of terms is negative at some stage in the iterating; and a stopping condition comprising that the path planner fails to provide a path at some stage in the iterating.

Clause 15: The system of any of Clauses 11-14, wherein the operations further comprise: partitioning a space between the starting location and the destination location into a plurality of partially overlapping parts; and representing the obstacles as a subset of the plurality of partially overlapping parts.

Clause 16: The system of Clause 15, wherein the space is three dimensional, and wherein each part comprises a polytope.

Clause 17: The system of Clause 15 or 16, wherein each of the logical terms corresponds to a part of the plurality of partially overlapping parts.

Clause 18: The system of Clause 17, wherein each of the logical terms represents a statement that is true if and only if a corresponding part includes an obstacle.

Clause 19, the system of any of Clauses 15-18, wherein the representing the path from the starting location to the destination location as the disjunction of logical terms comprises: applying a membership algorithm to the path from the starting location to the destination location and to the plurality of overlapping parts.

Clause 20, the system of any of Clauses 11-19, wherein the determining the satisfiability condition of the conjunction of terms comprises applying an incremental satisfaction algorithm.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A method of establishing a sufficiency of a path planner to avoid a plurality of obstacles in planning a path of a vehicle from a starting location to a destination location, the method comprising:
   iterating, until a stopping condition of a plurality of predetermined stopping conditions occurs:
      obtaining, from the path planner, a path from the starting location to the destination location;
      representing the path from the starting location to the destination location as a disjunction of logical terms;
      conjoining the disjunction of terms to a propositional logic formula comprising a conjunction of terms representing previously considered paths from the starting location to the destination location;
      determining a satisfiability condition of the conjunction of terms, wherein the satisfiability condition represents whether the propositional logic formula is satisfiable using a Boolean satisfiability technique; and
      for a positive satisfiability condition, adding at least one corresponding obstacle of the plurality of obstacles to the path planner;
   providing a positive indication of sufficiency of the path planner to avoid the obstacles in planning a path from the starting location to the destination location based on the stopping condition; and traversing, by the vehicle, a path produced by the path planner.

2. The method of claim 1, wherein the vehicle comprises an aircraft, and wherein the path planner is implemented in the aircraft.

3. The method of claim 1, wherein the plurality of predetermined stopping conditions comprise:

a stopping condition comprising that the satisfiability condition of the conjunction of terms is negative at some stage in the iterating; and a stopping condition comprising that the path planner fails to provide a path at some stage in the iterating.

4. The method of claim 1, further comprising:

partitioning a space between the starting location and the destination location into a plurality of partially overlapping parts; and representing the obstacles as a subset of the plurality of partially overlapping parts.

5. The method of claim 4, wherein the space is three dimensional, and wherein each part comprises a polytope.

6. The method of claim 4, wherein each of the logical terms corresponds to a part of the plurality of partially overlapping parts.

7. The method of claim 6, wherein each of the logical terms represents a statement that is true if and only if a corresponding part includes an obstacle.

8. The method of claim 4, wherein the representing the path from the starting location to the destination location as the disjunction of logical terms comprises:

applying a membership algorithm to the path from the starting location to the destination location and to the plurality of overlapping parts.

9. The method of claim 1, wherein the determining the satisfiability condition of the conjunction of terms comprises applying an incremental satisfaction algorithm.

10. A system for establishing a sufficiency of a path planner to avoid a plurality of obstacles in planning a path of a vehicle from a starting location to a destination location, the system comprising:

an electronic processor; and electronic persistent memory comprising instructions that, when executed by the electronic processor, configure the electronic processor to perform operations comprising:

iterating, until a stopping condition of a plurality of predetermined stopping conditions occurs:

obtaining, from the path planner, a path from the starting location to the destination location;

representing the path from the starting location to the destination location as a disjunction of logical terms;

conjoining the disjunction of terms to a propositional logic formula comprising a conjunction of terms representing previously considered paths from the starting location to the destination location;

determining a satisfiability condition of the conjunction of terms, wherein the satisfiability condition represents whether the propositional logic formula is satisfiable using a Boolean satisfiability technique; and for a positive satisfiability condition, adding at least one corresponding obstacle of the plurality of obstacles to the path planner;

providing a positive indication of sufficiency of the path planner to avoid the obstacles in planning a path from the starting location to the destination location based on the stopping condition; and traversing, by the vehicle, a path produced by the path planner.

11. The system of claim 10, wherein the vehicle comprises an aircraft, and wherein the path planner is implemented in the aircraft.

12. The system of claim 10, wherein the plurality of predetermined stopping conditions comprise:

a stopping condition comprising that the satisfiability condition of the conjunction of terms is negative at some stage in the iterating; and a stopping condition comprising that the path planner fails to provide a path at some stage in the iterating.

13. The system of claim 10, wherein the operations further comprise:

partitioning a space between the starting location and the destination location into a plurality of partially overlapping parts; and representing the obstacles as a subset of the plurality of partially overlapping parts.

14. The system of claim 13, wherein the space is three dimensional, and wherein each part comprises a polytope.

15. The system of claim 13, wherein each of the logical terms corresponds to a part of the plurality of partially overlapping parts.

16. The system of claim 15, wherein each of the logical terms represents a statement that is true if and only if a corresponding part includes an obstacle.

17. The system of claim 13, wherein the representing the path from the starting location to the destination location as the disjunction of logical terms comprises:

applying a membership algorithm to the path from the starting location to the destination location and to the plurality of overlapping parts.

18. The system of claim 10, wherein the determining the satisfiability condition of the conjunction of terms comprises applying an incremental satisfaction algorithm.

\* \* \* \* \*